(12) United States Patent
Wood

(10) Patent No.: US 8,366,373 B2
(45) Date of Patent: Feb. 5, 2013

(54) COLLAPSIBLE, LIGHTWEIGHT MOUNT TO SUPPORT A CARGO LOADING DEVICE

(76) Inventor: Steven Wood, Carey, OH (US)

( * ) Notice: Subject to any disclaimer, the term of this patent is extended or adjusted under 35 U.S.C. 154(b) by 1752 days.

(21) Appl. No.: 10/905,171

(22) Filed: Dec. 20, 2004

(65) Prior Publication Data

US 2006/0133916 A1    Jun. 22, 2006

(51) Int. Cl.
*B60P 1/54* (2006.01)
(52) U.S. Cl. ........ 414/543; 414/462; 414/538; 414/541; 212/175; 212/176; 212/177; 212/180; 254/323; 254/385
(58) Field of Classification Search .................. 414/538, 414/539, 541, 542, 543, 462; 212/175, 176, 212/177, 180; 254/323, 385
See application file for complete search history.

(56) References Cited

U.S. PATENT DOCUMENTS

| | | | |
|---|---|---|---|
| 3,978,989 A * | 9/1976 | Avila, Jr. .................. | 212/176 |
| 4,383,791 A | 5/1983 | King | |
| 4,881,864 A | 11/1989 | Amato | |
| 4,930,970 A | 6/1990 | Sunderland | |
| 4,979,865 A | 12/1990 | Strickland | |
| 5,028,198 A | 7/1991 | Buhr | |
| 5,064,079 A * | 11/1991 | Bowerman .................. | 212/345 |
| 5,069,595 A | 12/1991 | Smith et al. | |
| 5,211,526 A | 5/1993 | Robinette | |
| 5,249,910 A * | 10/1993 | Ball .............................. | 414/538 |
| 5,509,639 A * | 4/1996 | Ellis .............................. | 414/538 |
| 5,511,929 A | 4/1996 | Loftus | |
| 5,755,549 A | 5/1998 | Ogrodnick | |
| 5,934,490 A * | 8/1999 | Mora ............................. | 212/176 |
| 6,089,431 A | 7/2000 | Heyworth | |
| 6,099,232 A | 8/2000 | Dixon et al. | |
| 6,152,675 A | 11/2000 | Compton | |
| 6,176,674 B1 * | 1/2001 | Meeks et al. .................. | 414/538 |
| 6,312,210 B1 * | 11/2001 | Lang .............................. | 414/540 |
| 6,379,100 B2 | 4/2002 | Schultz | |
| 6,382,898 B2 | 5/2002 | Mason | |
| 6,425,727 B1 | 7/2002 | Hood | |
| 6,435,360 B1 * | 8/2002 | Buchmeier .................. | 212/180 |
| 6,478,528 B1 | 11/2002 | Asbury | |
| 6,505,764 B2 | 1/2003 | Vining et al. | |
| 6,558,092 B1 | 5/2003 | Woodruff | |
| 6,561,489 B1 | 5/2003 | Wakefield | |
| 6,561,746 B1 | 5/2003 | Broussard et al. | |
| D475,499 S | 6/2003 | Hodge | |
| 6,571,553 B1 | 6/2003 | Habermann et al. | |

(Continued)

OTHER PUBLICATIONS

Definition of "brace", Merriam-Webster Online.*

*Primary Examiner* — Scott Lowe
(74) *Attorney, Agent, or Firm* — Foster Swift Collins & Smith PC; Allan O. Maki

(57) ABSTRACT

A fully collapsible lightweight mount to support a cargo loading apparatus. The mount has releasably attached horizontal and vertical arms, with a bracket to adjustably attach a cargo loading device on the vertical arm. In one embodiment, the horizontal arms have brackets configured to attach to "stake holes" in the standard side walls of a pickup truck cargo bed. The vertical arm of the device may be further supported against for example, a cargo bed forward wall or floor by a floor brace. Alternatively horizontal arm may attach to a pickup truck trailer hitch by additional mounts and connecting arm components suitable for attachment to a class 3 trailer hitch. The component parts can be readily assembled and disassembled, are lightweight, and occupy little space. The disassembled device can be stored in a carrying bag in the cab or other compartment of a vehicle.

13 Claims, 6 Drawing Sheets

U.S. PATENT DOCUMENTS

| | | |
|---|---|---|
| 6,572,083 B1 | 6/2003 | Topping, Jr. et al. |
| 6,578,711 B1 | 6/2003 | Chou |
| 6,578,824 B2 | 6/2003 | Samejima |
| 6,595,495 B1 | 7/2003 | Hung |
| 6,601,791 B2 | 8/2003 | Weimer et al. |
| 6,604,731 B2 | 8/2003 | Hodge |
| 6,616,397 B1 | 9/2003 | Lester |
| 6,899,238 B2 * | 5/2005 | Austin et al. ............ 212/270 |
| 7,070,059 B1 * | 7/2006 | Flowers et al. ........... 212/180 |
| 2003/0007855 A1 | 1/2003 | vanderHorn |

* cited by examiner

COLLAPSIBLE, LIGHTWEIGHT MOUNT TO SUPPORT A CARGO LOADING DEVICE

FIELD OF INVENTION

The invention generally relates to cargo loading devices and systems and specifically to a mount to support a cargo loading device.

BACKGROUND OF THE INVENTION

Several vehicle loading devices have been designed for use in light vehicles. See generally, U.S. Pat. Nos. 4,383,791; 4,930,970; 4,979,865; 5,028,198; 5,069,595; 5,511,929; 5,755,549; 6,099,232; 6,379,100; 6,382,898; 6,425,727; 6,561,746. Generally these devices involve boom or hoist assemblies, or large permanently installed frameworks that span the length of the cargo bed. Only one design teaches a simple truck winch system, U.S. Pat. No. 5,511,929. Unfortunately, the design is cumbersome, does not collapse into a kit and its mounting system would most likely not be able to handle the torque associated with pulling heavy loads into a bed of a truck.

Thus, there is a desire and need in the art to provide a simple, easily assembled, fully collapsible, adjustable, lightweight, mounting system for cargo loading devices sufficient to handle the torque associated with heavy loads.

SUMMARY OF THE INVENTION

The present invention provides a simple, fully collapsible, lightweight, mount to support a cargo loading device. The device is designed to adjust for mounting in a variety of different sized cargo beds and other various platforms, to be easily assembled and disassembled and conveniently stored.

Specifically, the present invention is a fully collapsible mount to support a cargo-loading device, such as a winch, and adapted for use in a variety of vehicles, such as pickup trucks or trailers with or without cargo bed side walls. The mount includes detachable horizontal and vertical arms. A bracket to support a cargo-loading device is adjustably attached to the vertical arm of the device. The mount may further be secured against torque by attachment of the horizontal arm of the device to an object such as the cargo bed side walls and by bracing the vertical arm of the device against the cargo bed rear wall or floor. Having both horizontal and vertical support, the invention may be practiced using lighter weight materials than those used in previous cargo loading devices, such as 6061 aluminum, a composite, thin hi-tensile steel, an the like.

In one embodiment, the horizontal arm of the device may be attached to a cargo bed by pegs which are shaped to fit "stake holes" in the side walls of a standard pickup truck and which have a bracket shaped to fit the horizontal arm. The vertical and horizontal arms are attached to each other by a bracket shaped to fit the vertical arm. The device is adjustable to fit vehicle beds of different sizes.

Mounted on the vertical arm, an optional portable winch may be raised from the cargo bed floor. This provides means for bringing cargo from any position to the cargo bed, without adjusting the winch position, and without causing scratches to the vehicle by the winch cable.

In another embodiment, the vertical arm is configured for mounting on a vehicle trailer hitch by additional mount and connecting arm components.

Other features of the present invention will become more apparent to persons having ordinary skill in the art to which the present invention pertains from the following description and claims taken in conjunction with the accompanying figures.

BRIEF DESCRIPTION OF THE FIGURES

The foregoing features, as well as other features, will become apparent with reference to the description and figures below, in which like numerals represent like elements, and in which.

DETAILED DESCRIPTION OF THE INVENTION

The present invention generally relates to portable cargo loading devices suitable for use on light trucks, heavy trucks, sport utility vehicles, minivans, station wagons, watercraft, aircraft, spacecraft, personnel carriers, trailers, animals, and the like. The present invention is a simple, fully collapsible, lightweight, mount to support a cargo loading device and system such as a winch. The invention is designed to adapt and adjust for mounting in a variety of applications (using optional brackets), such as different sized cargo beds, and the like and to be easily assembled and disassembled and conveniently stored.

Figure 1:
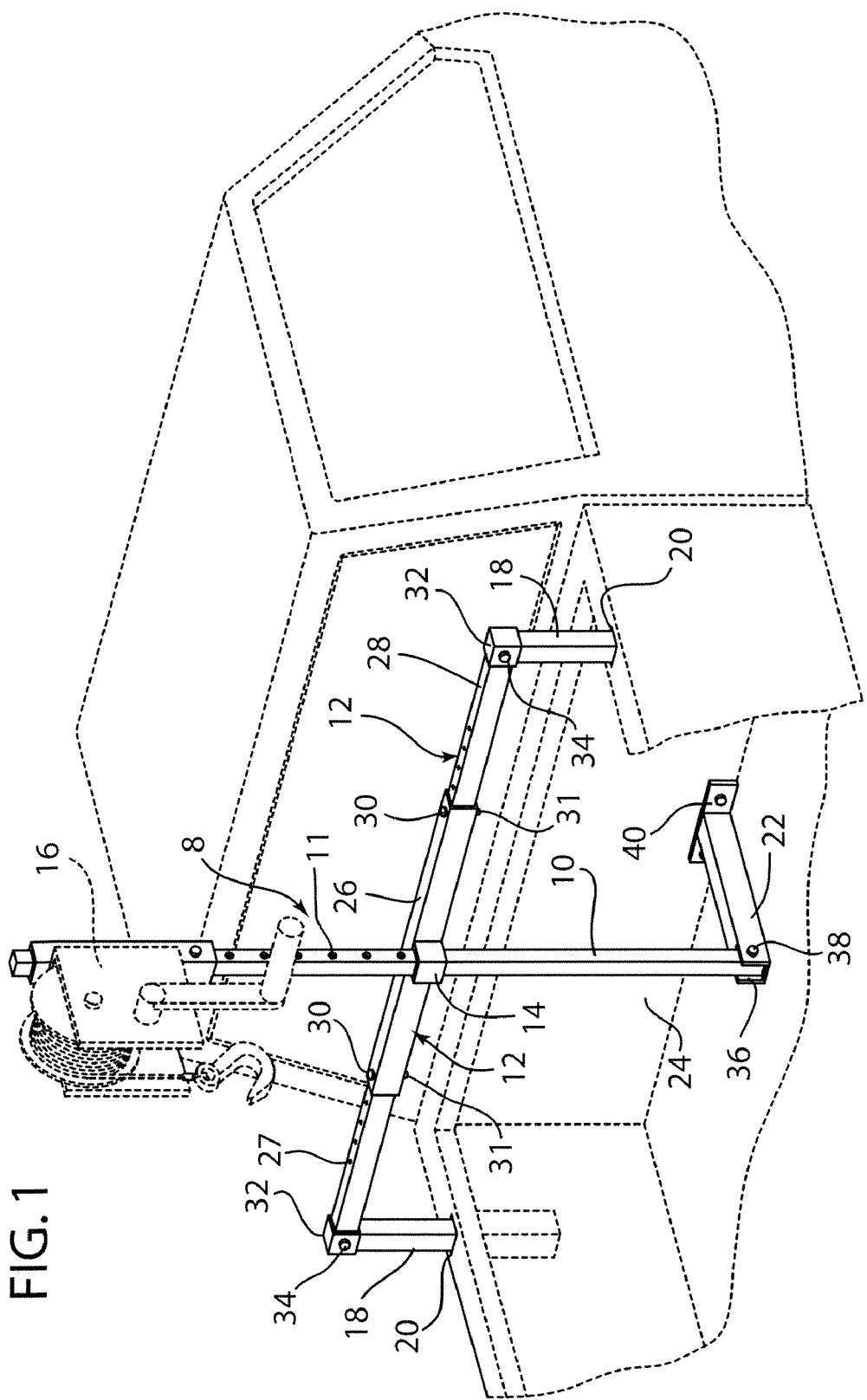
FIG. 1 provides a perspective view of one embodiment of the fully assembled mount for a cargo loading device in use.
Figure 2:
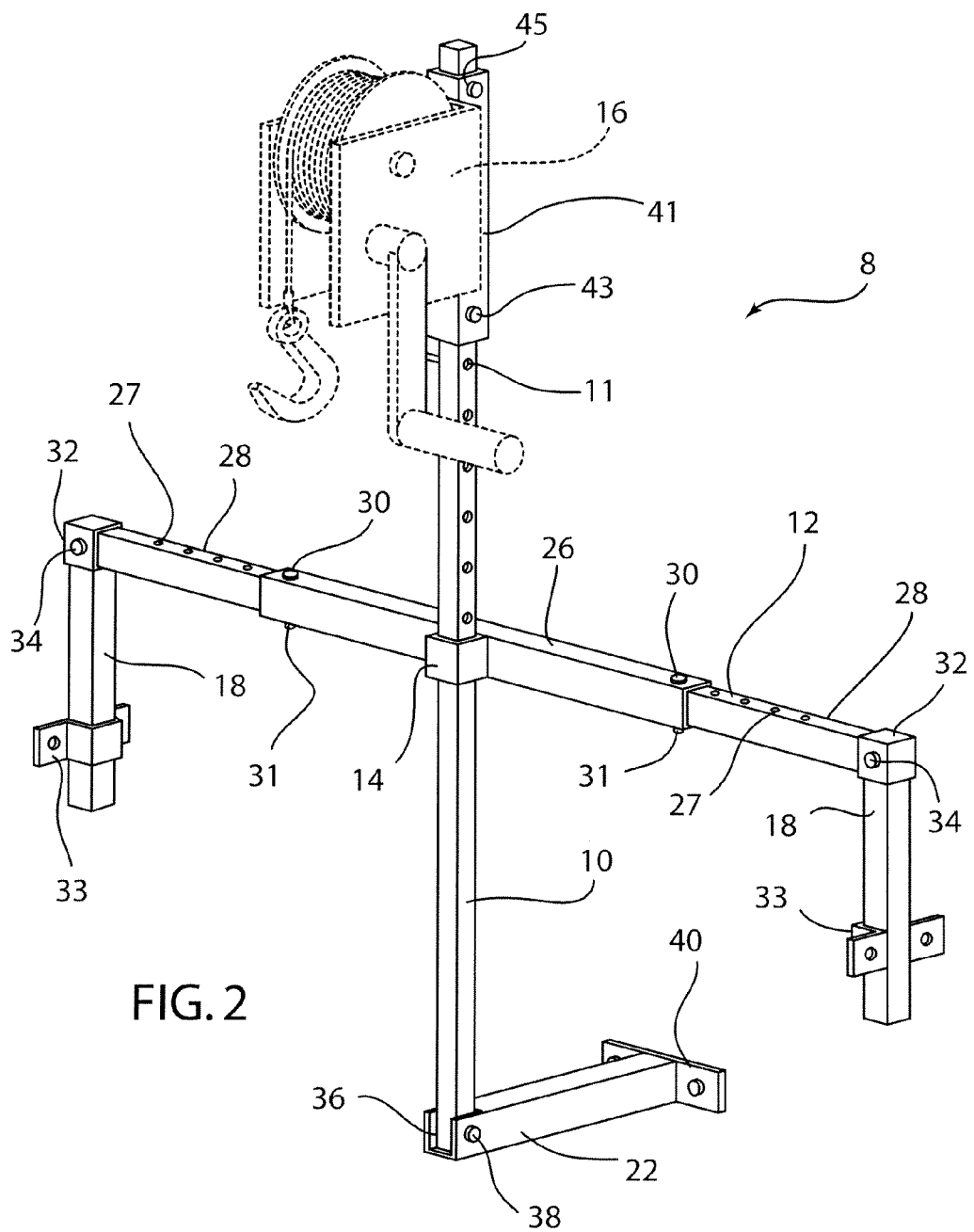
FIG. 2 provides a side perspective view of one embodiment of the present invention, showing attachment of a winch to the top end of the vertical arm and optional brackets.

To better illustrate the mount of the present invention, FIGS. 1 and 2, show a fully assembled mount (generally indicated at 8) installed in a cargo bed of a pickup truck with a winch as a cargo loading device. Typically, cargo beds for pickup trucks include a floor, a forward wall positioned behind the cab, a rear wall provided with a tailgate, and side walls. Both side walls typically have "stake holes" spaced at regular and equivalent intervals. In the illustrated embodiment, mount 8 attaches to side walls of the cargo bed by means of pegs shaped to fit these "stake holes."

Unlike any portable cargo loading device of the prior art, the simple winch system of the present invention is fully collapsible with component parts that can be readily assembled and disassembled. The disassembled device is maximally lightweight and occupies minimal space. The device may also be stored in an optional carrying bag or box.

Generally mount 8 may have an optional winch or other cargo loading device attached to the vertical arm, which may be in turn attached to the horizontal arm. The horizontal arm is attached to cargo bed side walls. The vertical arm may be braced against the cargo bed forward wall or floor. Support against torque generated by operation of the winch is provided both by the vertical arm, braced against the cargo bed forward wall or floor, and by the horizontal arm, attached to the cargo bed side walls. Mount 8 is adjustable in length, to fit cargo beds of various sizes and can be made of a variety of materials. By way of example only, it could be made of 6061 aluminum, composite, thin hi-tensile steel, and the like. Additional support against torque is provided in mount 8 by a floor brace that supports the vertical structural element against the cargo bed forward wall or floor. Because a cargo loading device is mounted on the vertical arm, it may be adjustably raised from the cargo bed. This allows cargo to be drawn from any position without moving the vehicle or adjusting the location of the winch. This also reduces the risk of scratches to the vehicle caused by movement of the winch cable.

Referring now to the figures, FIG. 1 provides a perspective view of one embodiment of the fully assembled mount 8 to support a cargo loading device. Mount 8 may include a vertical arm 10 attached to a horizontal arm assembly 12 by bracket means 14 on horizontal arm 12 that is shaped to receive vertical arm 10. Other embodiments may include alternative attachment means for the vertical and horizontal arms 10 and 12. For example, vertical arm 10 could be configured in "light" applications to just slide into conventional "stake holes" 20 in cargo bed side walls of a conventional pickup truck (not shown). In this application, horizontal arm assembly 12 would not be needed.

Vertical arm 10 may also include various adjustment means to reduce or extend its overall length using telescoping means well know in the art. Vertical arm 10, as shown, may also have a plurality of evenly spaced holes 11 configured to receive a cargo loading device such as a winch 16. Other means to attach a cargo loading device are also possible and well known in the art such as clamping devices.

Mount 8, as illustrated in the figures, is configured to receive a cargo loading device, such as a winch 16, attached at a top end of the vertical arm 10. Other types of cargo loading devices known in the art that may be used include a pulley system, "chainfall," tow strap, "come along," rope, block and tackle, and the like. As used in this context, the term "top end" refers to that end of the vertical arm 10 that is above horizontal arm 12. Horizontal arm 12 may have attachable/detachable "stake hole" pegs 18 shaped to fit conventional "stake holes" 20 in cargo bed side walls of a conventional pickup-truck. Other embodiments could include alternative means for attaching the horizontal arm or arms 12 to cargo bed side walls or any other structure in other applications sufficient to support the forces needed by the cargo loading device.

The horizontal arm 12 may be formed by three segments—a middle segment 26 and two end segments 28 shaped to fit inside the middle segment 26. The horizontal arm middle segment 26 has openings 30 at both ends suitable for engaging locking pins. Each horizontal arm end segment 28 has a plurality of regularly spaced openings 27, at both ends, suitable for engaging locking pins 31 disposed through openings 30. The segments 26 and 28 may be separate pieces or held together with slides and work in a telescoping fashion. The end segments 28 are attached to both ends of the middle segment 26 by means of locking pins 30 engaged through aligned openings 31 in the end and middle segments 26 and 28. Horizontal arms of different lengths can be assembled by using different openings in the end segments to attach the middle segment. Other embodiments could include alternative arrangements of the horizontal arm or arms.

As illustrated, horizontal arm 12 is attached to vehicle bed side walls by pegs 18 that are shaped to fit spaced "stake" holes 20 commonly found in the cargo bed side walls. Pegs 18 can optionally be coated with any suitable material, to avoid scratches to the cargo bed side walls. At their top end, the pegs 18 may be integral with horizontal arm 12 or have a bracket 32 that is shaped to fit horizontal arm end segments 28. Bracket 32 has openings suitable for engaging locking pins 34. As used in this context, the term "top end" refers to that end of the pegs 18 that is not in contact with the cargo bed side walls.

Each horizontal arm end segment 28 is attached to peg 18 by bracket 32 and by locking pin 34 engaged through aligned openings in the pegs 18 and end segments 28. Other embodiments may include alternative means for attaching the horizontal arm 12 or arms to cargo bed side walls. For example, as shown in FIG. 2, an optional bracket 33 could be provided where the application of mount 8 does not provide "stake" holes. Brackets 33, designed to receive the vertical posts ("stake hole" pegs), could be temporarily or permanently mounted to, for example, a bedwall, boat transom, aircraft wall, etc.

Additional support against torque generated by operation of winch 16 or other cargo loading device may be provided by floor brace 22 that may be integral or attached to the vertical arm 10 providing support against the cargo bed forward wall 24. Floor brace 22 (as shown more specifically in FIG. 3) may attach to vertical arm 10 through opening 36 that is shaped to fit the vertical arm 10, and by locking pins 38 engaged through aligned openings in the floor brace 22 and vertical arm 10. An optional pad 40 provides protection against scratches caused by operation of the floor brace 22 against the cargo bed forward wall 24. Other embodiments may include alternative means for bracing the vertical arm 10 against cargo bed forward wall 24 or against the cargo bed floor.

In the embodiment shown in FIG. 2, winch 16 is attached to the vertical arm 10 by means such as a bracket 41 on the winch 16 that is shaped to fit the vertical arm 10. Bracket 41 has openings 45 suitable for engaging locking pins. The winch 16 is further secured to the vertical arm 10 by locking pins 43 engaged through aligned openings 45 and 11 in the winch bracket 41 and vertical arm 10. Other embodiments could include alternative means for attaching the winch 16 and vertical arm 10.

Figure 3:
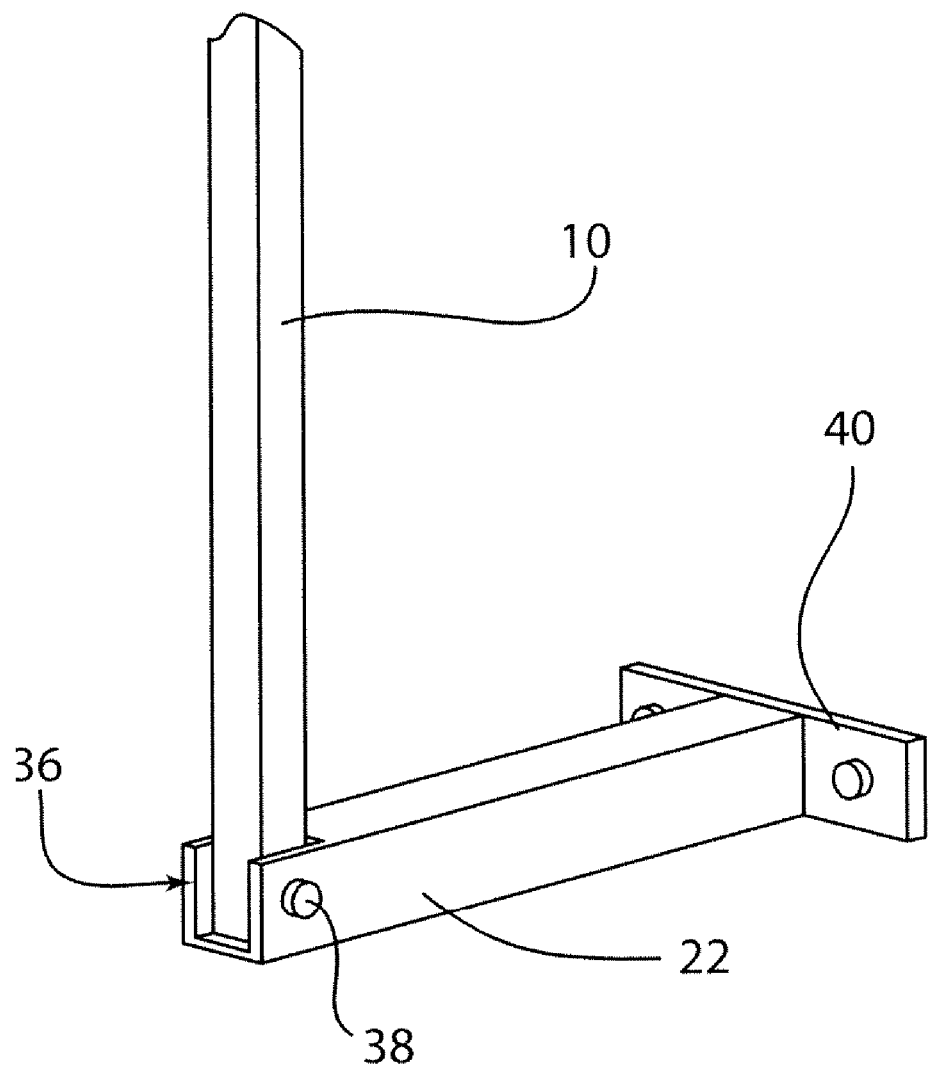
FIG. 3 provides a side perspective view of one embodiment of the apparatus, showing attachment of the vertical arm to the floor brace that supports it against the cargo bed rear wall.

FIG. 3 provides a close look at one embodiment of floor brace 22 that supports the vertical arm 10. As shown, the floor brace 22 has a top and bottom horizontal side. As used in this context, the term "top horizontal side" refers to that side of the floor brace that is opposite the side in contact with the cargo bed floor. The term "vertical sides" refers to those sides of the floor brace that are perpendicular to the horizontal sides. The opening 36 in the floor brace 22 that is shaped to fit the vertical arm 10 is in the top horizontal side. The vertical arm 10 engages the floor brace 22 perpendicularly. The floor brace 22 also has openings in the vertical sides suitable for engaging locking pins 38. In this embodiment, the floor brace 22 is shaped to fit the gap between the cargo bed forward wall 24 and the position of the vertical arm 10 when standing upright in the fully assembled and mounted apparatus.

Figure 4:
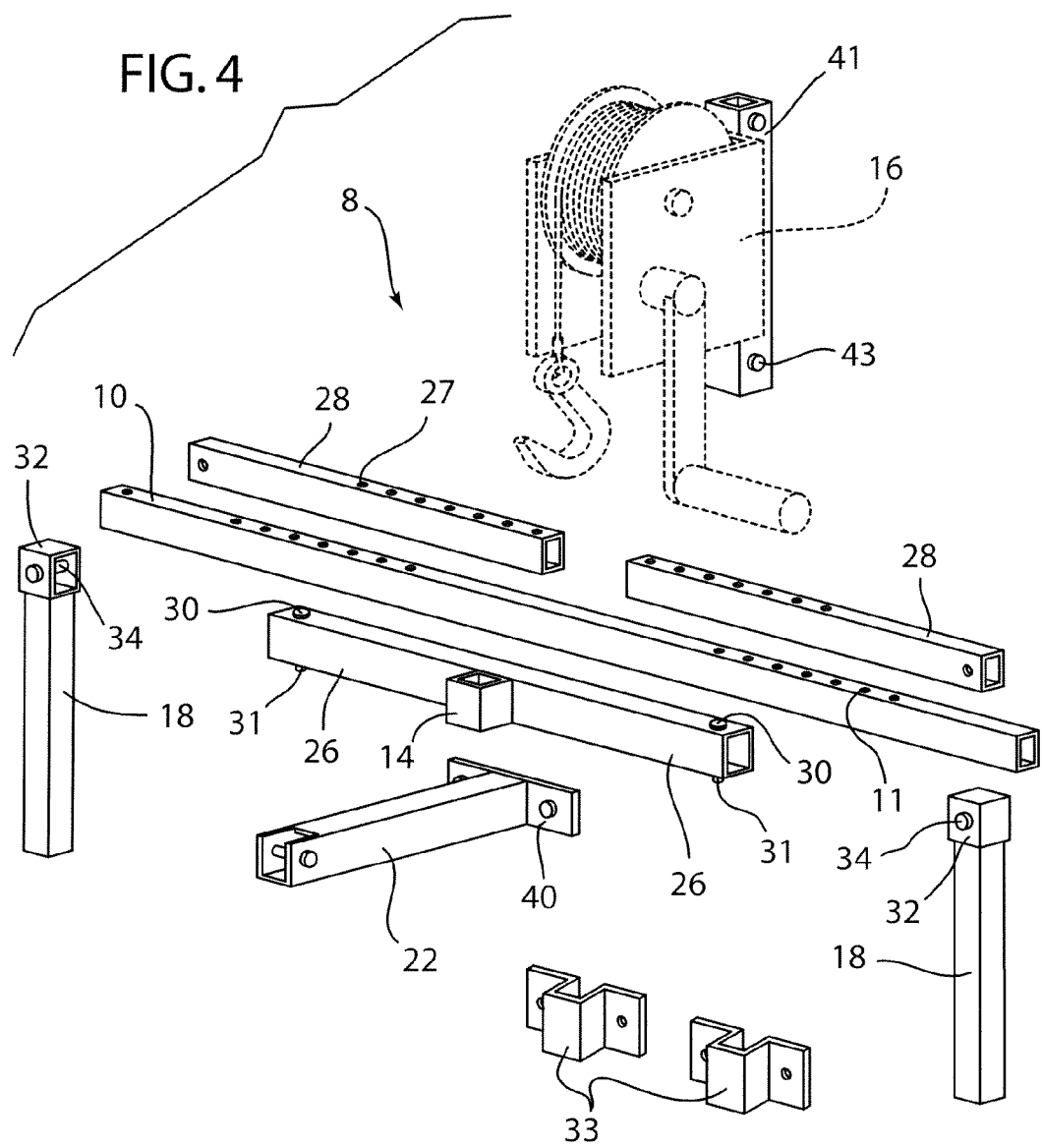
FIG. 4 illustrates each of the component parts fully disassembled and ready for storage.

FIG. 4 shows the lightweight cargo loading apparatus in its fully disassembled condition, ready for storage. Occupying little space, the disassembled device can be stored conveniently in a carrying bag (not shown) in the cab or other compartment of a vehicle.

Figure 5:
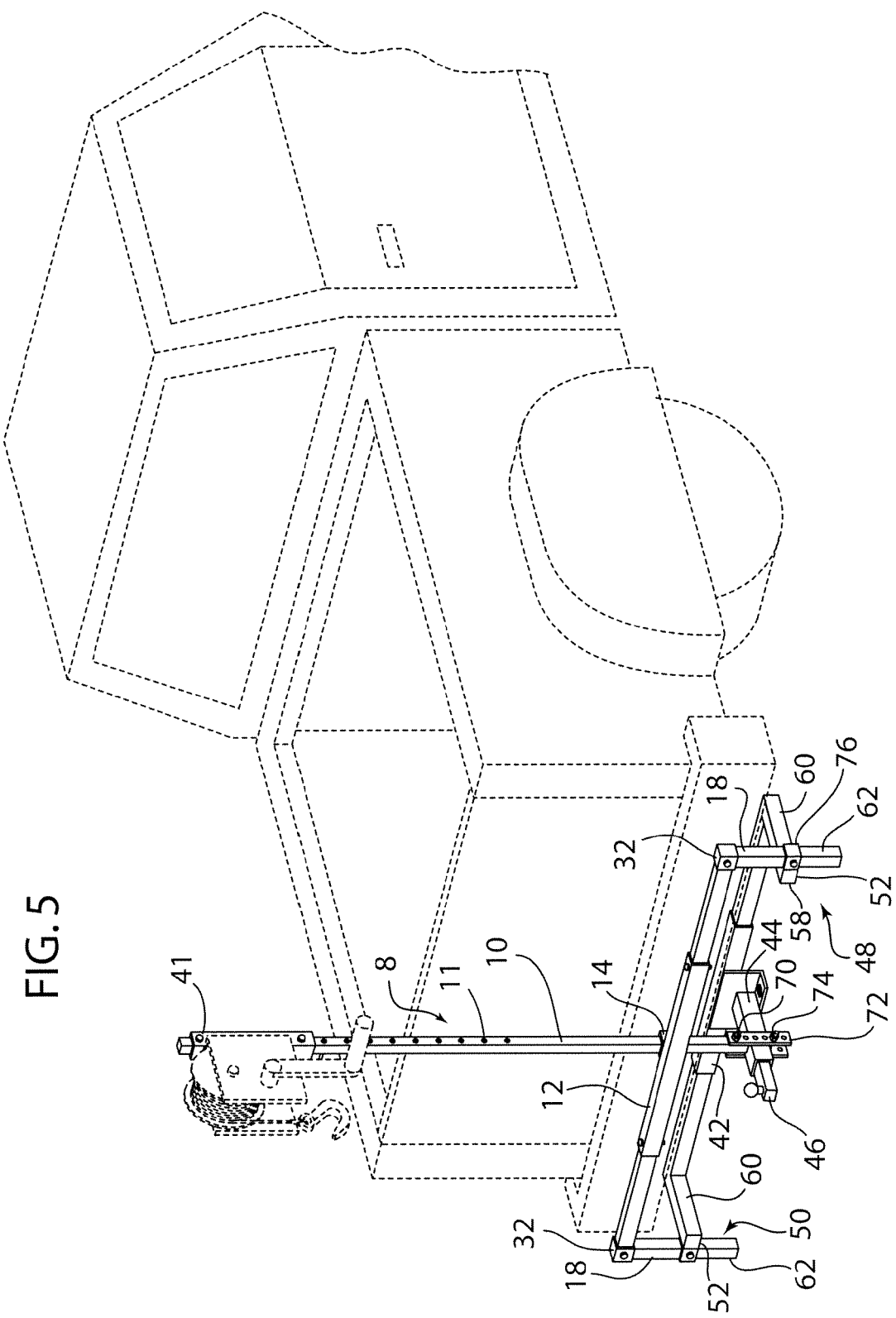
FIG. 5 shows an alternate embodiment of the present invention configured for attachment to a trailer hitch bracket of a vehicle.

FIG. 5 shows mount 8 attached to a trailer hitch of a conventional light truck using optional brackets (right mount) 48 and (left mount) 50. Typically, a pickup truck has a trailer hitch comprising a horizontal hollow bar 42 with open ends mounted to a vehicle's chassis and a perpendicular rearwardly protruding bar 44 with a trailer hitch peg 46. Horizontal hollow bar 42 may be found in a conventional OEM class 3 trailer hitch configuration. In this embodiment, the vertical arm 10 is clamped against the rearwardly protruding bar 44 by clamp 70. Clamp 70 may have, and as illustrated, a pair of clamping plates 72 having a plurality of holes to allow a fastening device such as a nut and bolt combination 74 to clamp against trailer hitch peg 46 and to vertical arm 10. This configuration still allows use of the hitch.

The right mount 48 is suited to fit inside the right side of horizontal hollow bar 42, as viewed from the rear of the vehicle, providing an upright orientation of a perpendicular connecting arm bracket 62. The left mount 50 is suited to fit inside the left side of the horizontal hollow bar 42, as viewed from the rear of the vehicle, providing an upright orientation of its perpendicular connecting arm bracket 62.

Figure 6:
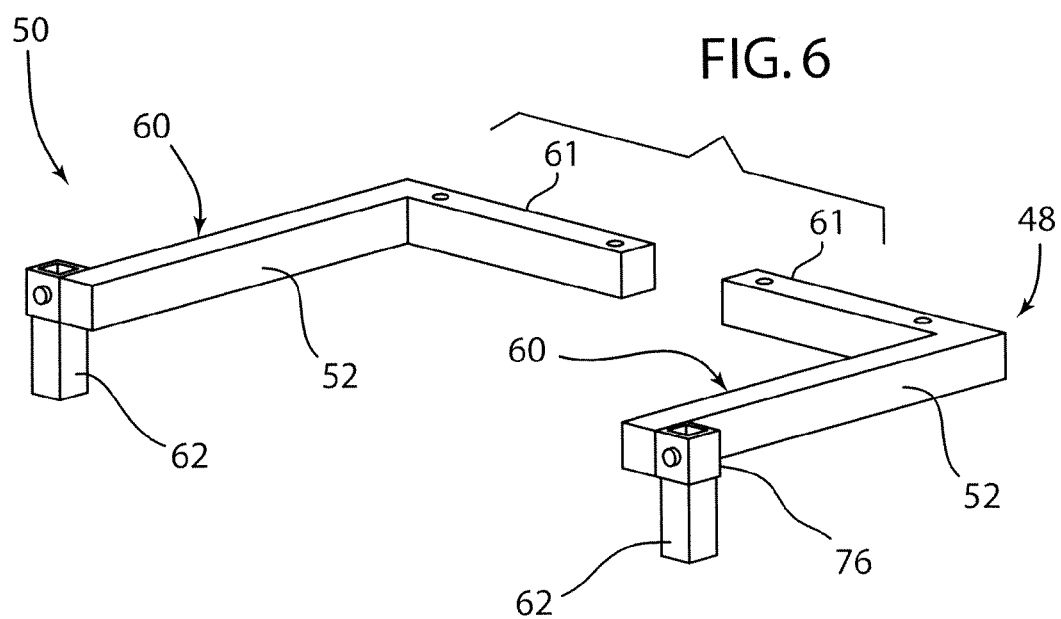
FIG. 6 provides a top view of right and left mounts of the alternate embodiment shown in FIG. 5.

To attach mount 8 to a vehicle in this embodiment right mount 48 and left mount 50 are inserted into the open ends of horizontal hollow bar 42. FIG. 6 provides detail of the right mount 48 and left mount 50. Mounts 48 and 50 include an L-shaped bar 60 with a perpendicularly attached bracket 62 attached. Distal end 61 of the L-shaped bar 60 of each mount 48 and 50 is shaped to fit inside the open ends of hollow trailer hitch bar 42, thereby securing mounts 48 and 50 to the vehicle. Proximal end 52 attaches a perpendicular bracket 62 of each mount 48 and 50. As shown, the mount includes a sleeve 76 into which pegs 18 may slide. A fastener such as a nut and bolt combination may be used to retain peg 18 in sleeve 76.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A collapsible, lightweight mount to support a cargo loading device, said mount being adapted for mounting to a cargo box of a motor truck, said cargo box having a floor, a forward upstanding wall and upstanding side walls attached to opposite ends of said forward wall, each of said side walls having at least one stake receiving opening in an upper surface thereof, said apparatus comprising:
  a combination wherein said mount includes first and second fasteners for securing said mount to said cargo box, said first fastener including at least one vertical arm having an upper end adapted to extend above said cargo box and to support a cargo loading device at an elevation substantially above said upstanding side and forward walls and a lower end adapted to depend into said cargo box and having_means to removably attach said mount to said cargo box or said forward wall at a location adjacent to said floor of said cargo box;
  said second fastener including a horizontal arm attached to said vertical arm centrally of said upper and lower ends with opposite ends of said horizontal arm extending laterally from opposite sides of said vertical arm; and
  each of said ends having a depending peg attached thereto for attaching the opposite ends of said horizontal arm to said stake receiving openings of said side walls.

2. The mount of claim 1, further comprising a cargo loading device attached to said upper end of said vertical arm.

3. The mount of claim 2, wherein the cargo loading device comprises a winch.

4. The mount of claim 1 wherein said at least one horizontal arm is adjustable in length.

5. The mount of claim 4, wherein said at least one horizontal arm comprises:
  a middle segment having openings at both ends suitable for engagement with locking pins; and
  two end segments having a plurality of regularly spaced openings at both ends suitable for engagement with locking pins.

6. The mount of claim 1, wherein said pegs are removably attached to said horizontal arm by locking pins engaged through aligned openings in the pegs and said horizontal arm.

7. The mount of claim 1, wherein said pegs are coated with suitable material to avoid to said cargo bed side walls.

8. The mount of claim 1, wherein the means for attaching said vertical arm to said forward wall comprises at least one horizontal arm attached to said at least one vertical arm.

9. The mount of claim 1, wherein said at least one vertical arm is telescoping.

10. The mount of claim 1, wherein the means for attaching said cargo loading device to said at least one vertical arm comprises a bracket configured to fit said at least one vertical arm.

11. The mount of claim 1, wherein the means for bracing said at least one vertical arm against the object comprises a floor brace shaped to fit the gap between a vehicle bed forward wall and the position of said at least one vertical arm when it is standing upright in the fully assembled and mounted apparatus.

12. The mount of claim 11, wherein said floor brace comprises:
  top and bottom horizontal sides;
  vertical sides;
  an opening in said top horizontal side configured to receive said at least one vertical arm; and
  openings in said vertical sides suitable for engagement of locking pins through aligned openings in said floor brace and said at least one vertical arm.

13. The mount of claim 11, wherein said floor brace further comprises a pad of suitable material to avoid scratches of the cargo bed side walls.

\* \* \* \* \*